United States Patent
Chiang

(10) Patent No.: US 11,325,230 B2
(45) Date of Patent: May 10, 2022

(54) TOOL EXTENSION ROD

(71) Applicant: SHIN YING ENTPR CO., LTD., Taichung (TW)

(72) Inventor: Wen-Hung Chiang, Taichung (TW)

(73) Assignee: SHIN YING ENTPR CO., LTD., Taichung (TW)

( * ) Notice: Subject to any disclaimer, the term of this patent is extended or adjusted under 35 U.S.C. 154(b) by 346 days.

(21) Appl. No.: 16/734,903

(22) Filed: Jan. 6, 2020

(65) Prior Publication Data

US 2021/0205967 A1    Jul. 8, 2021

(51) Int. Cl.
*B25B 23/00*    (2006.01)
*B25B 23/12*    (2006.01)
*B23B 31/107*   (2006.01)

(52) U.S. Cl.
CPC .......... *B25B 23/0035* (2013.01); *B25B 23/12* (2013.01); *B23B 31/107* (2013.01); *B25B 23/0021* (2013.01)

(58) Field of Classification Search
CPC ............ B25B 23/0007; B25B 23/0021; B25B 23/0035; B25B 23/12
See application file for complete search history.

(56) References Cited

U.S. PATENT DOCUMENTS

| | | | | |
|---|---|---|---|---|
| 9,381,627 B2* | 7/2016 | Chen | ..................... | B23B 31/003 |
| 10,434,632 B2* | 10/2019 | Chang | ................. | B25B 23/0035 |
| 10,543,587 B2* | 1/2020 | Chiang | ................... | B25B 13/06 |
| 10,625,404 B2* | 4/2020 | Chu | ....................... | B25B 15/004 |
| 11,090,782 B2* | 8/2021 | Chiang | ................... | B25B 13/28 |
| 11,167,398 B2* | 11/2021 | Chen | ................... | B25B 23/0035 |
| 11,203,097 B2* | 12/2021 | Chiang | ................ | B25B 13/102 |
| 2014/0174263 A1* | 6/2014 | Moss | ...................... | B25B 23/12 |
| | | | | 81/125 |
| 2017/0274509 A1* | 9/2017 | Tsai | ................... | B25B 23/0035 |
| 2020/0023502 A1* | 1/2020 | Zimmermann | ..... | B25B 23/0035 |

FOREIGN PATENT DOCUMENTS

TW    M559227 U    5/2018

* cited by examiner

*Primary Examiner* — David B. Thomas
(74) *Attorney, Agent, or Firm* — Muncy, Geissler, Olds & Lowe, P.C.

(57) ABSTRACT

A tool extension rod includes a main piece, a sliding sleeve, and a magnetic assembly. The sliding sleeve is slidably sleeved onto the main piece. When the sliding sleeve moves between a first position and a second position, the magnetic assembly is movable along an axial direction.

10 Claims, 8 Drawing Sheets

TOOL EXTENSION ROD

BACKGROUND OF THE INVENTION

Field of the Invention

The present invention relates to a tool extension rod.

Description of the Prior Art

A tool extension rod is usually used to connect to a driving tool for rotating workpieces, such as bolts and drill bits. A common tool extension rod is shown in patent TW M559227. The tool extension rod can be connected to drill bits or fastening elements. That is, the tool extension rod of TW M559227 is only used in the drilling tool.

However, the tool extension rod is more often used to rotate the fastening element directly. The tool extension rod of TW M559227 can be used in the fastening element in a single size. To rotate the fastening elements in different sizes, different tool extension rods have to be prepared and exchanged.

SUMMARY OF THE INVENTION

The main object of the present invention is to provide a tool extension rod having two connecting sleeves in different sizes for rotating workpieces in different sizes. In addition, the magnetic assembly is axially movable to attract the workpiece firmly.

To achieve the above and other objects, the tool extension rod of the present invention includes a main piece, a sliding sleeve, and a magnetic assembly.

The main piece includes a driving portion and a working portion which are connected along an axial direction. The driving portion is adapted for connecting to a driving tool. The working portion has an interior space and a first connecting sleeve. The first connecting sleeve communicates the interior space along the axial direction. The sliding sleeve is slidably sleeved onto the working portion and is movable between a first position and a second position. The sliding sleeve has a second connecting sleeve. A radial size of the second connecting sleeve is larger than a radial size of the first connecting sleeve. The magnetic assembly is received in the interior space and is movable along the axial direction. The magnetic assembly is movable between the first connecting sleeve and the second connecting sleeve following the sliding sleeve.

When the sliding sleeve moves toward the driving portion to be located at the first position, the second connecting sleeve is received in the first connecting sleeve. The first connecting sleeve is adapted for a first workpiece to insert therein. The magnetic assembly is located at the first connecting sleeve and is axially movable based on an insertion length of the first workpiece.

When the sliding sleeve moves away from the driving portion to be located at the second position, the second connecting sleeve is protruded out of the first connecting sleeve. The second connecting sleeve is adapted for a second workpiece to insert therein. The magnetic assembly is located at the second connecting sleeve and is axially movable based on an insertion length of the second workpiece.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
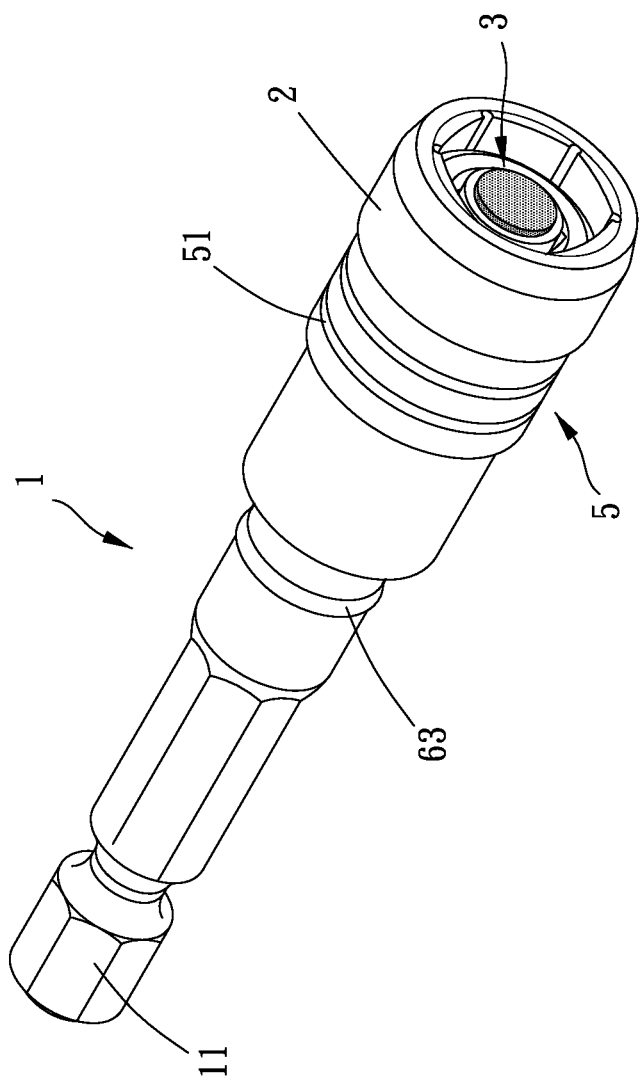
FIG. 1 is a stereogram of the present invention.
Figure 2:
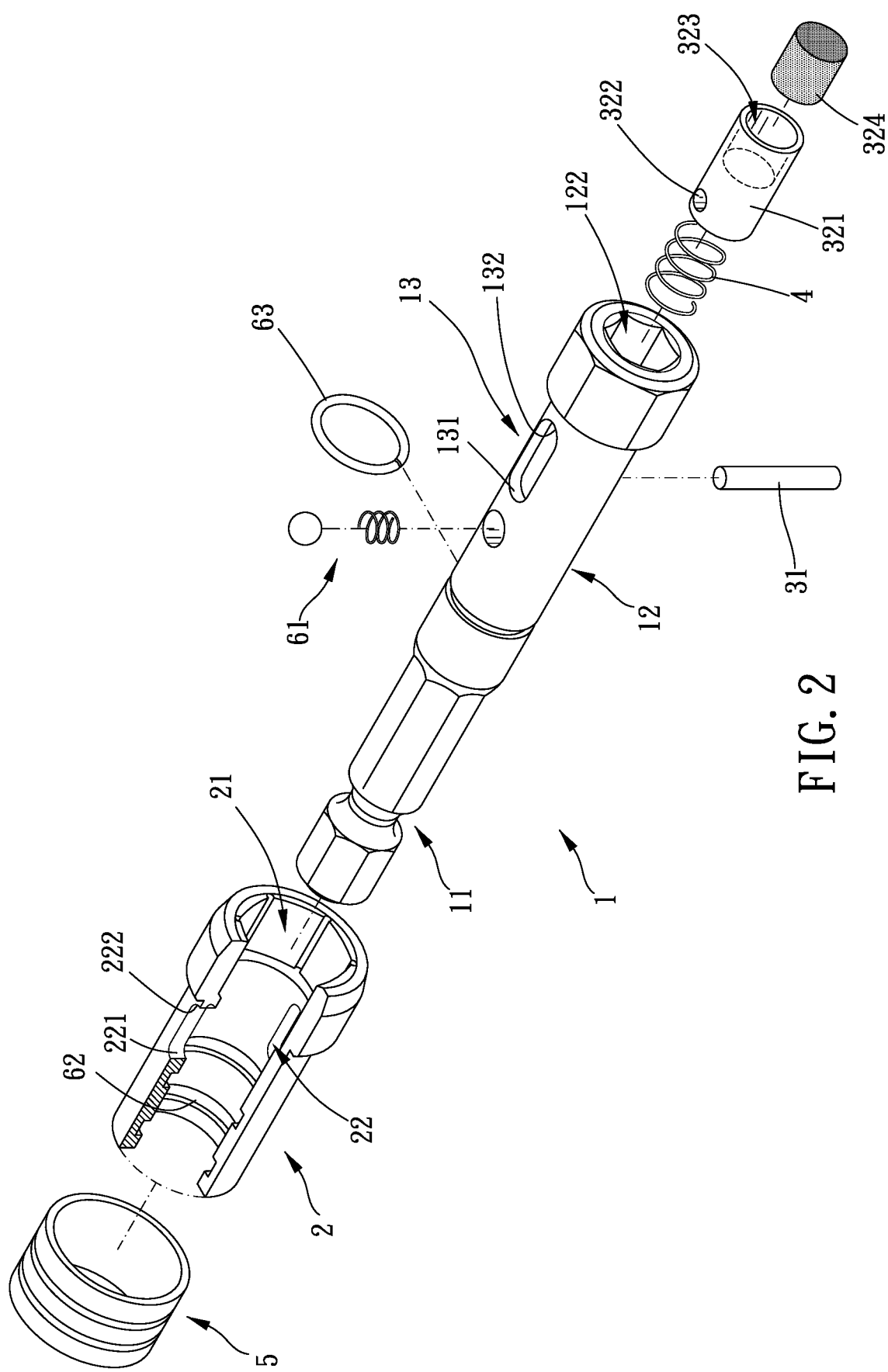
FIG. 2 is a breakdown drawing of the present invention.
Figure 3:
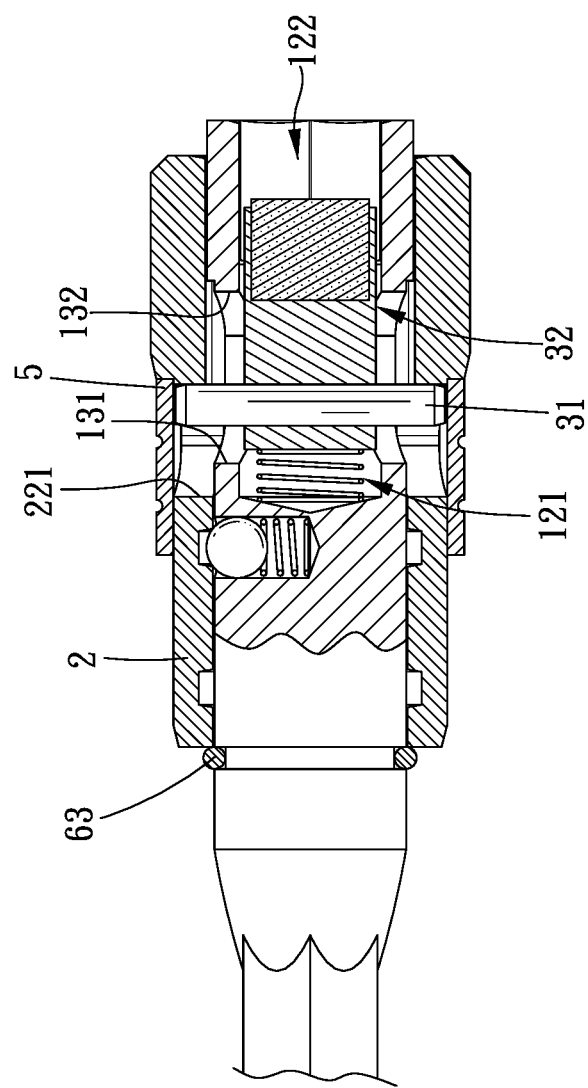
FIG. 3 is a partial profile showing a sliding sleeve at a first position of the present invention.

Please refer to FIG. 1 to FIG. 8, the tool extension rod of the present invention includes a main piece 1, a sliding sleeve 2, and a magnetic assembly 3.

The main piece 1 includes a driving portion 11 and a working portion 12 which are connected along an axial direction. The driving portion 11 is adapted for connecting to a driving tool. The working portion 12 has an interior space 121 and a first connecting sleeve 122. The first connecting sleeve 122 communicates the interior space 121 along the axial direction. The sliding sleeve 2 is slidably sleeved onto the working portion 12 and is movable between a first position and a second position. The sliding sleeve 2 has a second connecting sleeve 21. A radial size of the second connecting sleeve 21 is larger than a radial size of the first connecting sleeve 122. Thus, the first connecting sleeve 122 or the second connecting sleeve 21 is selected by the user by sliding the sliding sleeve 2. The magnetic assembly 3 is received in the interior space 121 and is movable along the axial direction. The magnetic assembly 3 is movable between the first connecting sleeve 122 and the second connecting sleeve 21 following the sliding sleeve 2 so that the magnetic assembly 3 is functional no matter which one of the first connecting sleeve 122 and the second connecting sleeve 21 is selected.

Figure 4:
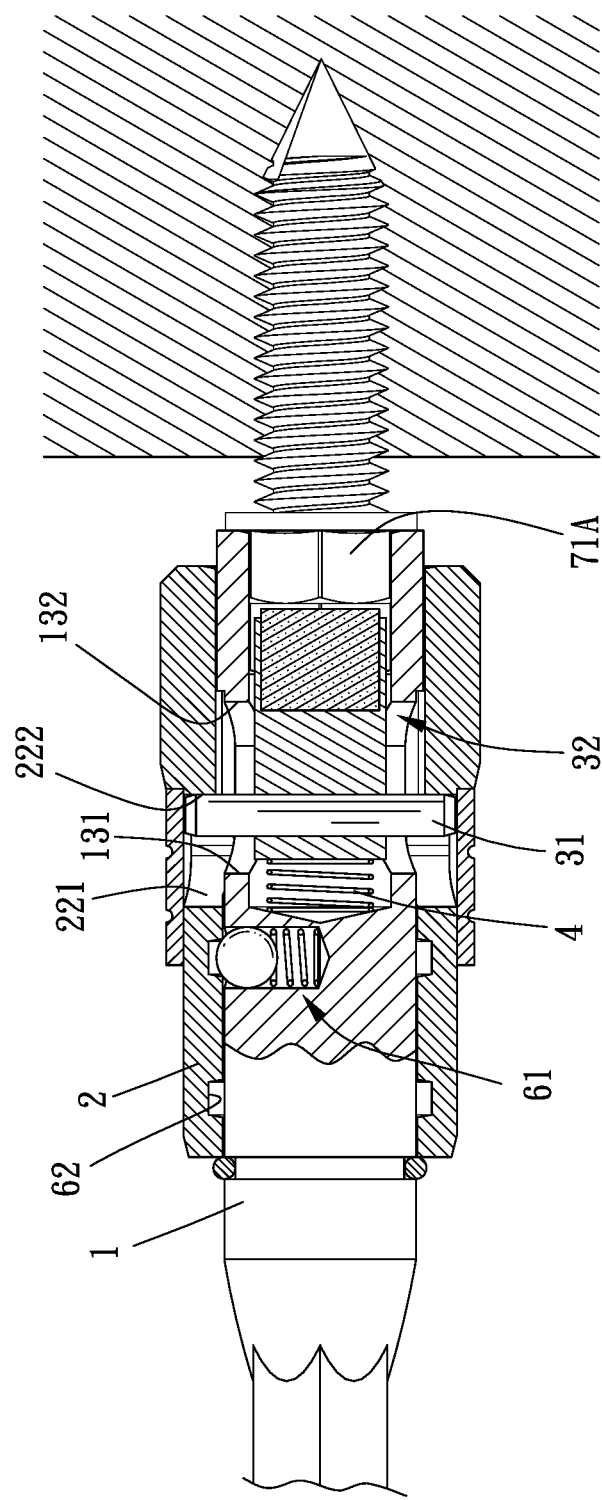
FIG. 4 is an illustration showing a first state of FIG. 3.
Figure 5:
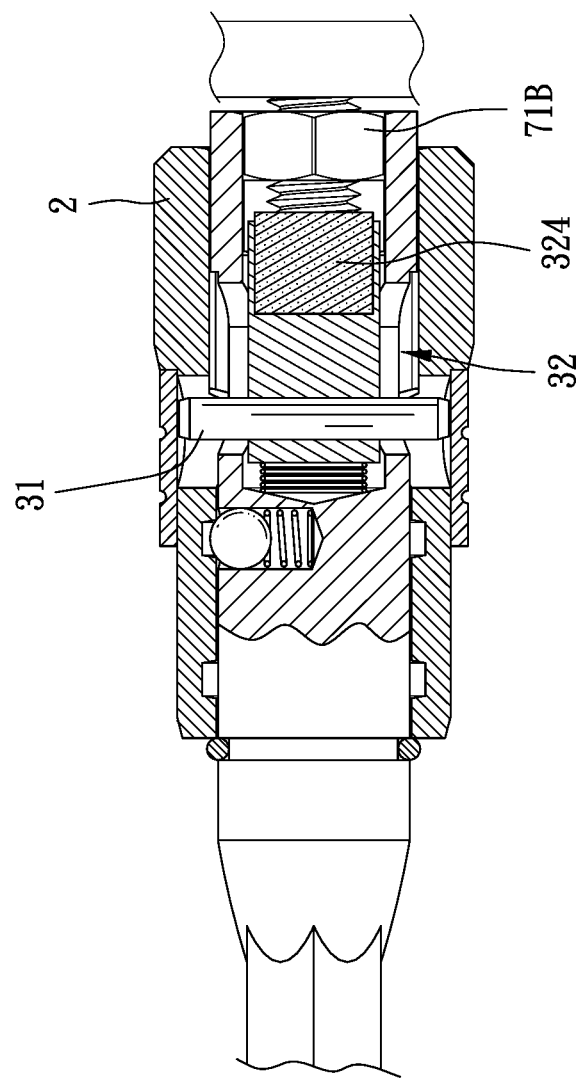
FIG. 5 is an illustration showing a second state of FIG. 3.
Figure 6:
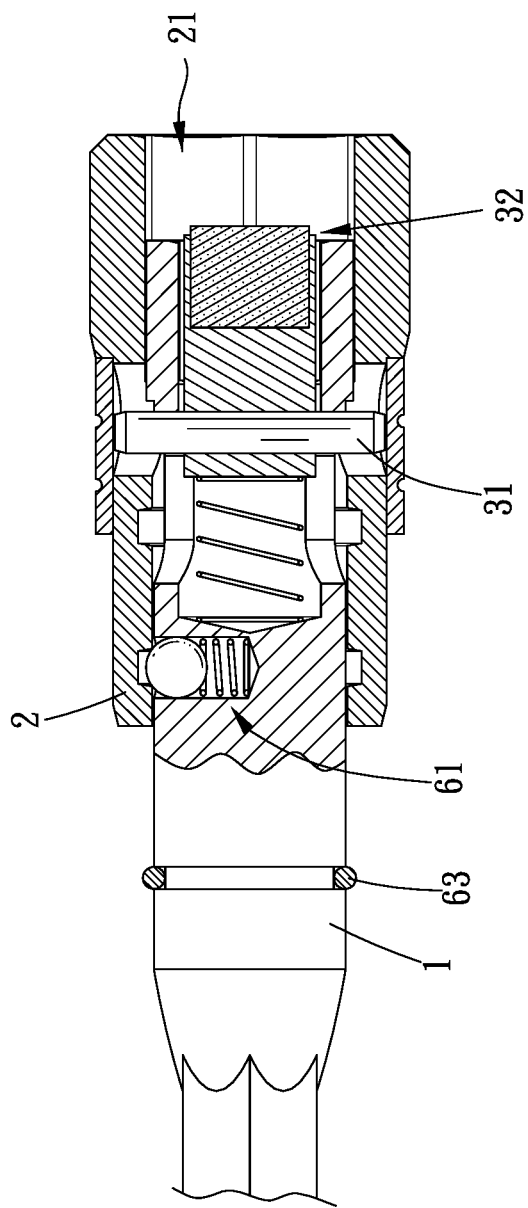
FIG. 6 is a partial profile showing a sliding sleeve at a second position of the present invention.

When the sliding sleeve 2 moves toward the driving portion 11 to be located at the first position, the second connecting sleeve 21 is received in the first connecting sleeve 122. The first connecting sleeve 122 is adapted for a first workpiece 71A,71B (such as nut or bolt) to insert therein. The magnetic assembly 3 is located at the first connecting sleeve 122 and is axially movable based on an insertion length of the first workpiece 71A,71B. Thereby, the magnetic assembly 3 can move along the axial direction according to the size of the first workpiece 71A,71B or other surrounded elements. For example, the first workpiece 71A in FIG. 4 is a bolt. However, the first workpiece 71B in FIG. 5 is a nut penetrated by a bolt, and the magnetic assembly 3 can be moved rearward in accordance with the insertion of a bolt.

Figure 7:
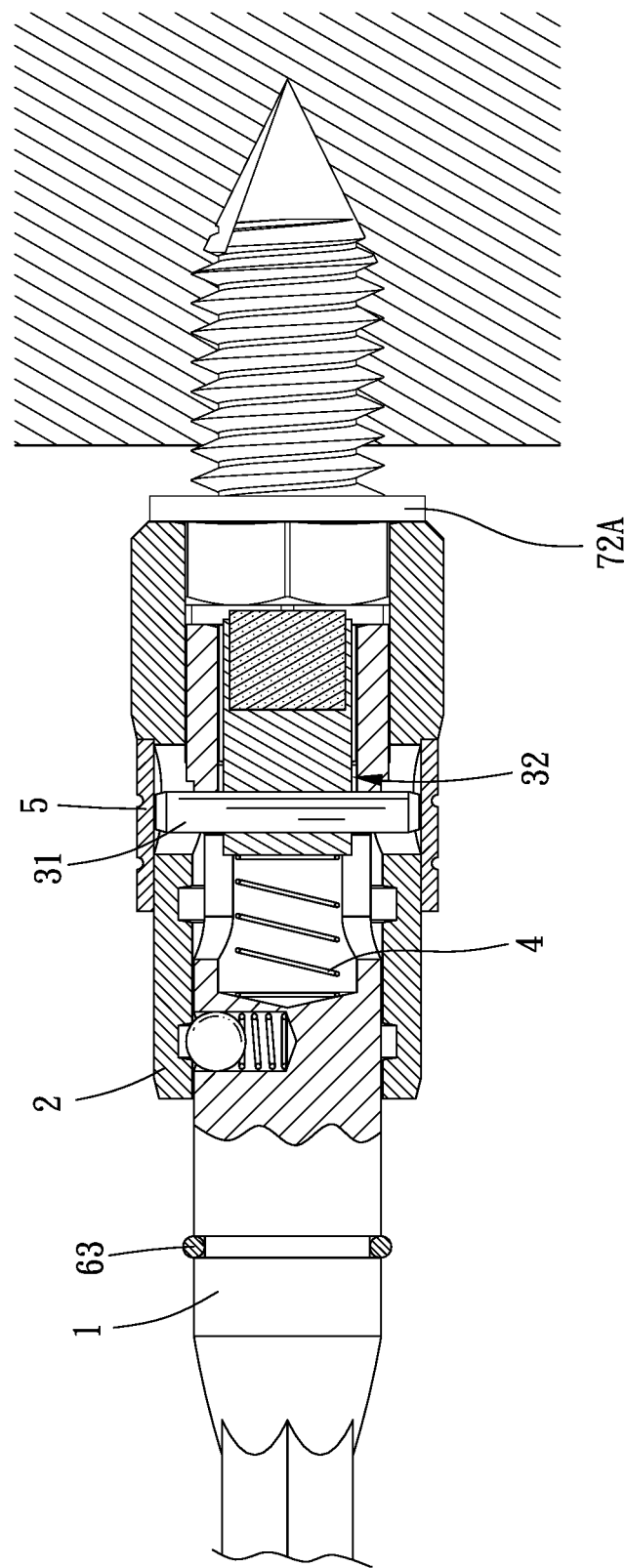
FIG. 7 is an illustration showing a first state of FIG. 6.
Figure 8:
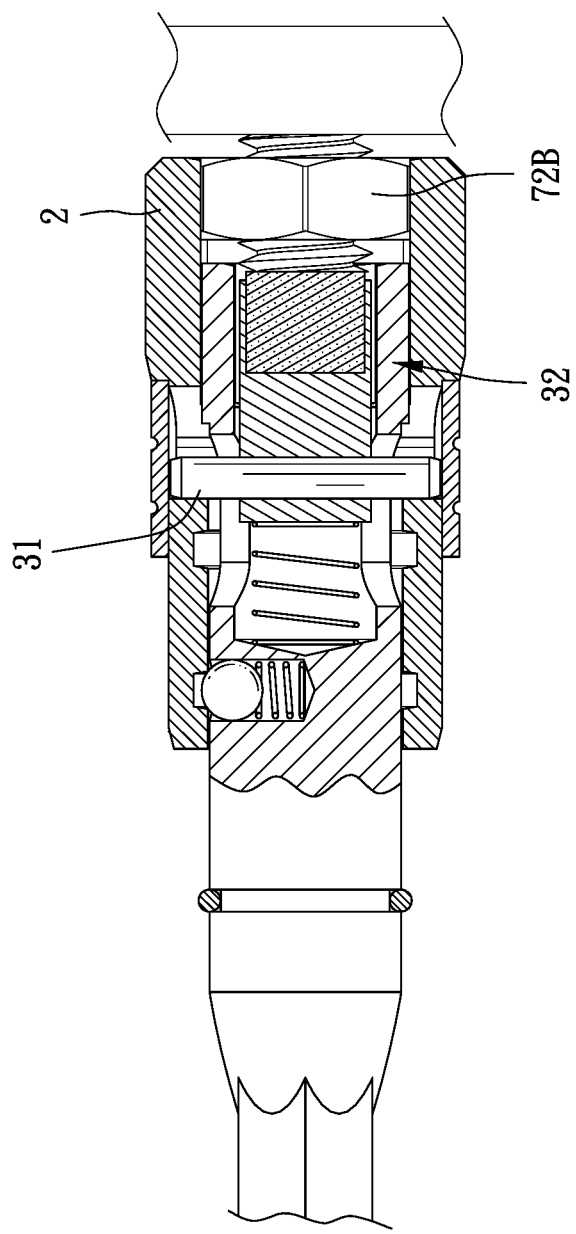
FIG. 8 is an illustration showing a second state of FIG. 6.

When the sliding sleeve 2 moves away from the driving portion 11 to be located at the second position, the second connecting sleeve 21 is protruded out of the first connecting sleeve 122. The second connecting sleeve 21 is adapted for a second workpiece 72A,72B to insert therein. The magnetic assembly 3 is located at the second connecting sleeve 21 and is axially movable based on an insertion length of the second workpiece 72A,72B. For example, the second workpiece 72A in FIG. 7 is a nut. However, the second workpiece 72B in FIG. 8 is a nut penetrated by a bolt.

That is to say, no matter which one of the first connecting sleeve 122 and the second connecting sleeve 21 is selected by the user, the magnetic assembly 3 is movable along the axial direction to fit the workpiece. In other words, the magnetic assembly can attract the workpieces in different sizes to prevent the workpieces from falling.

Specifically, the main piece 1 has at least one first sliding groove 13 communicating the interior space 21. The sliding sleeve 2 has at least one second sliding groove 22 communicating the at least one first sliding groove 13. The magnetic assembly 3 includes a sliding pin 31 and a magnetic element 32. The sliding pin 31 is inserted through the magnetic element 32 to link-up with the magnetic element 32. The sliding pin 31 is slidably arranged in the first sliding groove 13 and extends into the second sliding groove 22. The magnetic element 32 magnetically attracts the first workpiece 71A,71B or the second workpiece 72A,72B. In the present embodiment, the magnetic element 32 includes a base body 321 and a magnetic piece 324. The base body 321 is formed with a through hole 322 and a receiving space 323. The magnetic piece 324 is received in the receiving space 323. The sliding pin 31 is inserted through the though hole 322 to be connected to the base body 321. In addition, the magnetic piece 324 and the base body 321 don't magnetically attract each other so the direction of the magnetic force is regulated to prevent from attracting other structures.

More specifically, two ends of the at least one first sliding groove along the axial direction are defined as a first stopping wall and a second stopping wall. The second stopping wall is remoter from the driving portion than the first stopping wall is. Two ends of the at least one second sliding groove along the axial direction are defined as a third stopping wall and a fourth stopping wall. The fourth stopping wall is remoter from the driving portion than the third stopping wall is. When the sliding sleeve is moved to the first position, the sliding pin is slidable only between the fourth stopping wall and the first stopping wall. When the sliding sleeve is moved to the second position, the sliding pin is slidable only between the third stopping wall and the second stopping wall. That is, when the sliding sleeve 2 slides with respect to the main piece 1, the range of sliding of the sliding pin 31 can be changed to make the magnetic element 32 protrude over the first connecting sleeve 122 or the second connecting sleeve 21.

In the present embodiment, the length of the first sliding groove 13 is larger than the length of the second sliding groove 22. When the sliding sleeve 2 is located at the first position and the sliding pin 31 abuts against the fourth stopping wall 222, the magnetic element 32 extends into the first connecting sleeve 122 but not protrude over the first connecting sleeve 122. When the sliding sleeve 2 is located at the second position and the sliding pin 31 abuts against the second stopping wall 132, the magnetic element 32 protrudes over the first connecting sleeve 122 and extends into the second connecting sleeve 21, but not protrude over the second connecting sleeve 21. Specifically, when the sliding sleeve 2 is located at the second position, the distance between the sliding pin 31 and the third stopping wall 221 is equal to the length of the magnetic element 32 protruded over the first connecting sleeve 122.

Preferably, the tool extension rod further includes a covering member 5 fixed on the sliding sleeve 2 to cover the at least one second sliding groove 22 to prevent the interior space 121 from being contaminated by the exterior (such as dust or bugs). Besides, the covering member 5 is formed with a plurality of annular grooves 51 on the outer surface thereof to provide larger contact area between the finger of the user and the covering member 5. Thus, the covering member 5 can be pushed smoothly and easily.

Preferably, the tool extension rod further includes an elastic member 4 biased between the inner wall of the interior space 121 and the magnetic assembly 3 so that the magnetic assembly 3 tends to move away from the driving portion 11 normally. In use, when the tool extension rod is connected to the workpiece, the magnetic assembly 3 moves to an desired position to abut against the workpiece so that the workpiece can be attracted firmly.

Preferably, the tool extension rod further includes a positioning assembly 61 and two positioning recesses 62 arranged spacedly. One of the positioning assembly 61 and the two positioning recesses 62 is arranged on the main piece 1, and the other one of the positioning assembly 61 and the two positioning recesses 62 is arranged on the sliding sleeve 2. When the positioning assembly 61 is coupled to one of the positioning recesses 62, the sliding sleeve 2 is positioned at the first position. When the positioning assembly 61 is coupled to the other one of the positioning recesses 62, the sliding sleeve 2 is positioned at the second position.

In the present embodiment, the tool extension rod further includes a restriction member 63 radially protruded from the working portion 12. When the sliding sleeve 2 is positioned at the second position, the sliding sleeve 2 abuts against the restriction member 63 to further prevent the sliding sleeve 2 from separating from the driving portion 11.

In conclusion, the tool extension rod of the present invention has two connecting sleeves in different sizes for selection. No matter which one of the connecting sleeves is selected, the magnetic assembly can move along the axial direction to fit the insertion length of the workpiece. Thus, the magnetic assembly can attract the workpiece firmly.

What is claimed is:
1. A tool extension rod, including:
a main piece, including a driving portion and a working portion which are connected along an axial direction, the driving portion being adapted for connecting to a driving tool, the working portion having an interior space and a first connecting sleeve, the first connecting sleeve communicating the interior space along the axial direction;
a sliding sleeve, slidably sleeved onto the working portion and movable between a first position and a second position, having a second connecting sleeve, a radial size of the second connecting sleeve being larger than a radial size of the first connecting sleeve;
a magnetic assembly, received in the interior space and movable along the axial direction, movable between the first connecting sleeve and the second connecting sleeve following the sliding sleeve;
wherein when the sliding sleeve moves toward the driving portion to be located at the first position, the second connecting sleeve is received in the first connecting sleeve, the first connecting sleeve is adapted for a first workpiece to insert therein, the magnetic assembly is located at the first connecting sleeve and is axially movable based on an insertion length of the first workpiece; when the sliding sleeve moves away from the driving portion to be located at the second position, the second connecting sleeve is protruded out of the first connecting sleeve, the second connecting sleeve is adapted for a second workpiece to insert therein, the magnetic assembly is located at the second connecting sleeve and is axially movable based on an insertion length of the second workpiece.

2. The tool extension rod of claim 1, wherein the main piece has at least one first sliding groove, the at least one first sliding groove communicates the interior space; the sliding sleeve further has at least one second sliding groove, the at least one second sliding groove communicates the first sliding groove; the magnetic assembly includes a sliding pin and a magnetic element, the sliding pin is inserted through the magnetic element to link-up with the magnetic element, the sliding pin is slidably arranged in the first sliding groove and extends into the second sliding groove, the magnetic element is adapted for magnetically attracting the first workpiece or the second workpiece.

3. The tool extension rod of claim 2, further including a covering member fixed on the sliding sleeve to cover the at least one second sliding groove.

4. The tool extension rod of claim 2, wherein two ends of the at least one first sliding groove along the axial direction are defined as a first stopping wall and a second stopping wall, the second stopping wall is remoter from the driving portion than the first stopping wall is, two ends of the at least one second sliding groove along the axial direction are defined as a third stopping wall and a fourth stopping wall, the fourth stopping wall is remoter from the driving portion than the third stopping wall is; when the sliding sleeve is moved to the first position, the sliding pin is slidable only between the fourth stopping wall and the first stopping wall; when the sliding sleeve is moved to the second position, the sliding pin is slidable only between the third stopping wall and the second stopping wall.

5. The tool extension rod of claim 4, wherein when the sliding sleeve is located at the first position and the sliding pin abuts against the fourth stopping wall, the magnetic element extends into the first connecting sleeve but not extend out of the first connecting sleeve; when the sliding sleeve is located at the second position and the sliding pin abuts against the second stopping wall, the magnetic element extends out of the first connecting sleeve and further extends into the second connecting sleeve but not extends out of the second connecting sleeve.

6. The tool extension rod of claim 5, wherein when the sliding sleeve is located at the second position, a distance between the sliding pin and the third stopping wall is equal to a length of the magnetic element extending out of the first connecting sleeve.

7. The tool extension rod of claim 6, further including a covering member, a positioning assembly, two positioning recesses arranged spacedly, a restriction member, and an elastic member, the covering member being fixed on the sliding sleeve to cover the at least one second sliding groove; one of the positioning assembly and the two positioning recesses being arranged on the main piece, the other one of the positioning assembly and the two positioning recesses being arranged on the sliding sleeve; wherein when the positioning assembly is coupled to one of the positioning recesses, the sliding sleeve is positioned at the first position; wherein when the positioning assembly is coupled to the other one of the positioning recesses, the sliding sleeve is positioned at the second position; the restriction member radially being protrudingly disposed on the working portion, the sliding sleeve abutting against the restriction member along the axial direction when the sliding sleeve is positioned at the second position; the elastic member being biased between a wall of the interior space and the magnetic assembly so that the magnetic assembly is normally pushed away from the driving portion; the magnetic element including a base body and a magnetic piece, the base being formed with a through hole and a receiving space, the magnetic piece being received in the receiving space, the sliding pin being inserted through the through hole to connect to the base body; the magnetic piece and the base body having no magnetic attraction therebetween; a plurality of annular grooves being formed on an outer surface of the covering member; a length of the first sliding groove being larger than a length of the second sliding groove.

8. The tool extension rod of claim 1, further including a positioning assembly and two positioning recesses arranged spacedly, one of the positioning assembly and the two positioning recesses being arranged on the main piece, the other one of the positioning assembly and the two positioning recesses being arranged on the sliding sleeve; wherein when the positioning assembly is coupled to one of the positioning recesses, the sliding sleeve is positioned at the first position; wherein when the positioning assembly is coupled to the other one of the positioning recesses, the sliding sleeve is positioned at the second position.

9. The tool extension rod of claim 8, further including a restriction member radially protrudingly disposed on the working portion, the sliding sleeve abuts against the restriction member along the axial direction when the sliding sleeve is positioned at the second position.

10. The tool extension rod of claim 1, further including an elastic member, the elastic member is biased between a wall of the interior space and the magnetic assembly so that the magnetic assembly is normally pushed away from the driving portion.

* * * * *